(12) United States Patent
Adam (10) Patent No.: US 9,919,761 B2
(45) Date of Patent: Mar. 20, 2018

(54) ELECTRIC-MOTORIZED KICK-SCOOTER (71) Applicant: Magna Exteriors GmbH, Sailauf (DE)

(72) Inventor: Christine Adam, Magdeburg (DE)

(73) Assignee: MAGNA Exteriors GmbH, Sailauf (DE)

( * ) Notice: Subject to any disclaimer, the term of this patent is extended or adjusted under 35 U.S.C. 154(b) by 0 days.

(21) Appl. No.: 15/600,426

(22) Filed: May 19, 2017

(65) Prior Publication Data
US 2017/0355421 A1    Dec. 14, 2017

(51) Int. Cl.
*B62K 15/00* (2006.01)
*B62M 6/40* (2010.01)
*B62M 6/75* (2010.01)
*B60L 11/18* (2006.01)
*B62K 21/12* (2006.01)
B62K 3/00 (2006.01)
B62K 11/00 (2006.01)

(52) U.S. Cl.
CPC ............ *B62M 6/75* (2013.01); *B60L 11/1877* (2013.01); *B62K 21/12* (2013.01); *B62K 3/002* (2013.01); *B62K 11/00* (2013.01)

(58) Field of Classification Search
CPC ...... B62K 15/00; B62K 15/006; B62K 3/002; B62K 2202/00; B62K 21/125; B62K 21/16; B62M 6/75; B62M 6/40
USPC .... 180/208, 220, 222, 223, 180, 181, 207.3; 74/551.3; 280/87.05
See application file for complete search history.

(56) References Cited

U.S. PATENT DOCUMENTS

| 864,202 | A | * | 8/1907 | Simmons | ................ E21B 19/08 403/60 |
| 5,848,660 | A | * | 12/1998 | McGreen | ............... B62K 3/002 180/208 |
| 8,720,918 | B2 | * | 5/2014 | Liao | ........................ B62K 3/002 280/287 |
| 8,801,010 | B2 | | 8/2014 | Deb | |
| 9,376,158 | B1 | * | 6/2016 | McCormick | ......... B62K 15/006 |
| 9,718,512 | B2 | * | 8/2017 | Mei | ....................... B62K 15/008 |
| 2011/0148061 | A1 | * | 6/2011 | Johnson | ................. B62K 3/002 280/87.041 |
| 2012/0256386 | A1 | * | 10/2012 | Benarrouch | ........... B62K 3/002 280/87.05 |
| 2014/0196968 | A1 | * | 7/2014 | Bieler | ...................... B62M 6/65 180/181 |
| 2015/0321722 | A1 | | 11/2015 | Dadoosh et al. | |
| 2016/0318572 | A1 | * | 11/2016 | Oh | ........................ B62K 15/006 |
| 2017/0106932 | A1 | * | 4/2017 | Mazoyer | ................ B62K 15/00 |
| 2017/0259871 | A1 | * | 9/2017 | Delgatty | .................... B62J 7/04 |

FOREIGN PATENT DOCUMENTS

| CN | 104691690 A | 6/2015 |
| CN | 204821876 U | 12/2015 |
| CN | 105620622 A | 6/2016 |
| DE | 29612276 U1 | 9/1996 |

(Continued)

*Primary Examiner* — Anne Marie M Boehler
(74) *Attorney, Agent, or Firm* — Jordon IP Law, LLC; Todd A. Vaughn (57) ABSTRACT A kick-scooter having an electric-motorized drive, a footboard, a rear wheel arranged on the footboard, a steering assembly, and a front wheel connected to the steering assembly to pivot in unison with the steering assembly about an inclined steering assembly axis.

20 Claims, 6 Drawing Sheets (56) References Cited

FOREIGN PATENT DOCUMENTS

| DE | 102012220011 A1 | 5/2014 |
|----|-----------------|--------|
| DE | 102013207517 A1 | 10/2014 |
| EP | 2514661 A1 | 10/2012 |
| EP | 2711279 A1 | 3/2014 |

* cited by examiner

ELECTRIC-MOTORIZED KICK-SCOOTER

CROSS-REFERENCE TO RELATED APPLICATIONS

The present application claims priority under 35 U.S.C. § 119 to German Patent Publication DE 102016210107.2 (filed on Jun. 8, 2016), which is hereby incorporated by reference in its entirety.

TECHNICAL FIELD

Embodiments relate to a kick-scooter also referred to as an electric-motorized kick-scooter, having an electric-motorized drive, a footboard, a rear wheel that is arranged on the footboard, a steering assembly, and a front wheel that is non-rotatably connected to the steering assembly to pivot in unison with the steering assembly about an inclined steering assembly axis.

BACKGROUND

A limited number of affordable and/or available parking spaces that are mostly time-limited, expensive and a good distance from the destination, environmental zones, lack of space in the city centres and overcrowded road systems associated with increasing energy costs make it difficult to be mobile.

This restriction of individual mobility is to be overcome via electric two-wheel vehicles that may be used either as an independent driving concept or may be stowed in the passenger car for last-mile-mobility.

Collapsible and/or folding bicycles and also folding scooters have been known for some time as camping accessories and/or boot accessories.

The electrical motorization of said bicycles etc. has progressed within the scope of an expanded mobility concept.

A purely electrically driven E-bike that does not have a pedal drive is known from http://www.dailymail.co.uk/video/sciencetech/video-1137633/The-worlds-folding-bike-Impossible-fits-bag.html, wherein the E-bike may be assembled in a multiplicity of collapsing and folding steps from its packed size, in which it may fit into a pack of hand-bag size up to a rucksack size, into its final ready-to-use size and then collapsed back into its packed size. DE 10 2010 027 997 A1 and http://www.elektrofahrrad24.de/news_vw-e-bike-bilder-zur-studie-12103#.V0FB-Onn36k likewise disclose a purely electrically driven E-Bike that does not have a pedal drive and requires fewer collapsing and folding steps between the packed size and the ready-to-use size but, when folded, this E-bike fills the spare wheel well in a medium-sized vehicle.

The two previously mentioned modes of transportation are disadvantageous owing to the fact that:

(1) they have a limited range, at the end of which they are prevented from continuing, rather than being assisted, owing to a lack of pedal drive, (2) a tolerable packed size is associated with a time-consuming multiplicity of assembling and collapsing steps, (3) a tolerable number of assembling and collapsing steps is associated with an unsatisfactory amount of space required by the packed size, and (4) there is no facility for a muscle power-operated drive, regardless of whether an electric-motorized assist device is provided or not.

With the advent of kickboards, which are equipped with a footboard, a handle bar, which may be folded down onto said footboard, two front wheels and one or more rear wheels. In contrast to bicycles and kick-scooters, a steering angle is achieved not via a pivot movement of a steering assembly, which is connected in a non-rotatable manner to a steerable wheel, about a steering axis that stands upright with respect to a roadway surface, but rather said steering angle is achieved, as in the case with skateboards, via laterally inclining the footboard about a tilt axis that extends parallel with the roadway surface. Small and particularly light mini kick-scooters, which could be collapsed to a minimum size without the use of tools and whose steering assembly may be folded down onto the footboard in a similar manner as to the handle bar of a kickboard, grew in popularity above all in city areas. In addition to a small wheel diameter of a maximum approx. 15 cm or 6", such mini kick-scooters are characterized by a simple and light construction whilst foregoing a saddle or any other seating facility and also by the facility of being able to reduce their packed-size dimension via folding down a steering assembly that is connected in a non-rotatable manner to the front wheel that may pivot about the steering axis that is perpendicular or inclined with respect to the footboard.

DE 10 2012 204 915 A1 discloses an electric-motorized mini-scooter which, in contrast to the previously mentioned E-bike that is driven purely electrically and without muscle-power, may be driven purely by muscle power in a manner that is usual for a mini kick-scooter. Furthermore, the electric-motorized mini kick-scooter may be moved forward assisted by muscle power in addition to a possible purely electrical drive. A braking function with an energy recovery facility extends the range of the mini kick-scooter, at the end of which said mini kick-scooter may continue with its onward travel assisted via the facility of an unlimited purely manually actuated drive. The steering assembly that is connected by way of a cardan joint to the front wheel that may pivot to and fro about a steering axis that is tilted inclined towards the front is arranged ahead of the front wheel. As a consequence, in the multiple-folded, collapsed state, the steering assembly extends beyond the front wheel which results in an awkward, less compact packed size.

For the sake of completeness, a kickboard that is disclosed in ES 2 508 991 A1 is also mentioned, wherein a footboard, which corresponds in its construction to that of a skateboard, transitions directly and in a seamless manner into a front plate that stands upright on its front face and assumes the function of a handle bar via a grip opening that is provided therein.

DE102013207517 A1 relates to a steering wheel suspension in which the steering wheel is rotatably mounted on a wheel axis that is connected to a steering assist arm and which is installed in a narrow-track vehicle.

US20150321722 describes a folding motor scooter that is provided with a battery. The motor scooter is folded in such a manner that the two wheels lie parallel with one another.

U.S. Pat. No. 8,801,010B2 discloses a scooter that comprises between its position for use and a position in which it may be stored a moveable structure for the third.

EP2514661 A2 discloses a 3-wheel scooter comprising 2 front wheels. The rear wheel pivots flat between the front wheels when the scooter is collapsed.

DE29612276 U1 relates to a kick-scooter having a folding articulated joint that is blocked via a pivot lever.

DE102012220011A1 discloses an operating device for operating an electric wheel that controls the velocity of the travel in dependence upon environmental parameters.

SUMMARY

Embodiments relate to an electric-motorized kick-scooter that may be converted with a few simple steps into a practical packed size or from a practical packed size into its ready-for-use size.

Embodiments relate to an electric-motorized kick-scooter, by way of example to an electric-motorized mini kick-scooter that has a wheel diameter of a maximum approx. 15 cm or 6", or an electric-motorized Full-Size kick-scooter that has a wheel diameter of by way of example 30 cm or 12", the kick-scooter comprising a footboard, a rear wheel that is arranged on the footboard, by way of example having a single tyre or twin-tyres, a steering assembly and a front wheel that is connected in a non-rotatable manner to the steering assembly and may pivot to and fro together with said steering assembly about an inclined steering assembly axis.

In accordance with embodiments, the steering assembly axis tilts in an inclined manner towards the rear starting from the front wheel.

In accordance with embodiments, the footboard comprises a standing portion that lies essentially parallel with the roadway when the kick-scooter is in use as a mode of transportation. Towards the front, towards the steerable front wheel, a forward portion that is angled upwards with respect to the standing portion adjoins said standing portion. The angle of incline of said forward portion that corresponds to the angle enclosed between the standing portion and the forward portion is preferably between 30° and 60°, particularly preferred 45°. The steering assembly axis, about which the front wheel together with the steering assembly that is non-rotatably connected to said front wheel is arranged in such a manner as to be able to pivot to and fro on the footboard, is orientated perpendicular to the forward portion that is inclined with respect to the standing portion.

It is important in this connection to emphasize that in the current document, in contrast to the term 'shaft' or 'spigot,' the term 'axis' describes a geometric axis and not a mechanical element.

The rear wheel is arranged on the end of the standing portion that is remote from the forward portion.

The steering assembly comprises a front portion and a connecting portion that adjoins said front portion. When the kick-scooter is in the ready-for-use size, by way of example when using the kick-scooter as a mode of transportation, the front portion of the steering assembly is arranged ahead of the front wheel.

The connecting portion encloses a bend angle with respect to the standing portion. The bend angle corresponds to the angle of the incline of said front portion, wherein at least in the case of wheel that is not at an angle the forward portion of the steering assembly and the standing portion of the footboard preferably enclose a right angle. The enclosed angle between the front portion of the steering assembly and the standing portion of the footboard may however also deviate from a right angle, by way of example it may be smaller in order to provide more foot-space, or greater in order in the case of a short footboard to achieve more arm freedom.

The footboard and the steering assembly are connected to one another at the forward portion and the connecting portion is such a manner as to be able to pivot about the steering assembly axis. The forward portion and the connecting portion extend over two parallel planes and the steering assembly axis is orientated normal to said planes.

The connecting portion is arranged on the lower face of the forward portion, said lower face facing the front wheel. When using the kick-scooter as a mode of transportation, the front portion is located ahead the forward portion. By virtue of a pivot movement about 180° about the steering assembly axis, the steering assembly may thus be moved to underneath the footboard, without actuating locking and/or unlocking devices, securable folding hinges, releasable bayonet connections or other fastenings, in order to achieve a compact packed size in which the steering assembly comes to lie parallel with the footboard with the minimum spacing required for the pivot movement from the lower face that is facing the roadway when the kick-scooter is being used as a mode of transportation.

The electric-motorized drive is integrated into the rear wheel and/or the front wheel. An electrical energy storage device that is preferably rechargeable is accommodated in or on the footboard, preferably in the standing portion of said footboard and/or in the steering assembly, preferably in the front portion of said steering assembly. The electric-motorized kick-scooter may preferably comprise actuating architecture that are arranged on the steering assembly to activate, deactivate and/or control the electric-motorized drive. As an alternative or in addition thereto, it is feasible to automatically control the electric-motorized drive in dependence upon a manually actuated forwards movement of the kick-scooter, by way of example, similar to an electric-motorized assist device in the case of electric bicycles, where the electric-motorized drive is only activated when using muscle power to actuate the pedal drive.

Practice of embodiments may impart the following advantages, inter alia:

(1) a small packed size and a light weight;
(2) a rapid and simple assembly procedure from the packed size to the ready-for-use size and also when packing up from the ready-for-use size to the packed size;
(3) a continuously available mobility;
(4) an intuitive drive;
(5) easy to manipulate and handle;
(6) minimum wear and tear owing to the materials used;
(7) a long range and high loadability; and
(7) the capability to use a replaceable electrical energy storage device that may be externally charged.

Alternatively or additionally, the kick-scooter in accordance with embodiments may comprise individual or a combination of multiple features that are described in the introduction in conjunction with other features described herein.

In addition, advantages imparted by practice of the embodiments extend beyond the full solution of the posed object and/or beyond the advantages mentioned initially with regard to the individual features are explained in the description hereinunder.

DRAWINGS

The invention is further explained hereinunder with reference to the exemplary embodiments illustrated in the drawing. The size ratios of the individual elements with respect to one another in the figures do not always correspond to the actual size ratios since some shapes have been simplified and other shapes have been enlarged in relation to other elements so as to improve the overview. Identical reference numerals are used for like or like-functioning elements of the invention. Moreover, for the sake of clarity, only those reference numerals that are required for the description of the respective figure are illustrated in the individual figures. The illustrated embodiments represent only examples of how the invention may be configured and do not represent any defining limitation. In a schematic illustration in the drawings.

DRAWINGS

As illustrated in FIGS. 1-6, an electric-motorized kick-scooter 01 may include an electric-motorized drive 02, a footboard 03, a rear wheel 04 that is arranged in a releasable manner on the footboard 03, a steering assembly 05, and a front wheel 06 that is non-rotatably connected to the steering assembly 05 and may pivot to and fro together with said steering assembly about a steering assembly axis 50 that is tilted in an inclined manner and indicated by the broken line in FIGS. 1A, 1B, 1C, and 6.

Figure 1A:
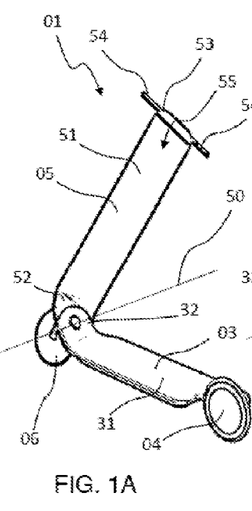
FIG. 1A illustrates a perspective view of a moment in which an electric-motorized kick-scooter is in a drive position, in accordance with embodiments.
Figure 1B:
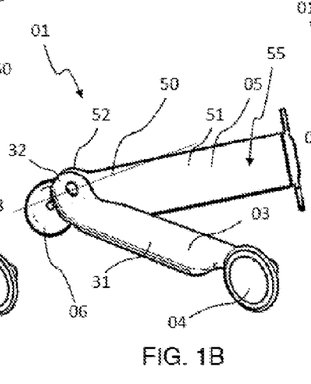
FIG. 1B illustrates a perspective view of a moment in which an electric-motorized kick-scooter is in an intermediate position, in accordance with embodiments.
Figure 1C:
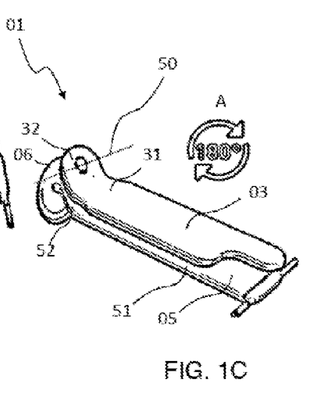
FIG. 1C illustrates a perspective view of a moment in which an electric-motorized kick-scooter is in a packed or storage position, in accordance with embodiments.

As illustrated in FIGS. 1A to 1C, the steering assembly 05 may be manipulated for movement between an operating position to a position underneath the footboard 03 by virtue of pivoting at a predetermined angle of 180° about the steering assembly axis 50. As a consequence, a compact packed size is achieved without the use of actuating locking and/or unlocking devices, securable folding hinges, releasable bayonet connections or other mechanical fasteners. The steering assembly 05 may come to lie parallel with the footboard 03 with a minimum spacing required for the pivot movement from the lower face that is facing the roadway when the kick-scooter 01 is in an operating position as a mode of transportation. For safety reasons, however, a pin or one or more ball(s) may latch in if the kick-scooter 01 is in the operating or drive configuration. Spring catches may be used for this purpose.

Figure 3A:
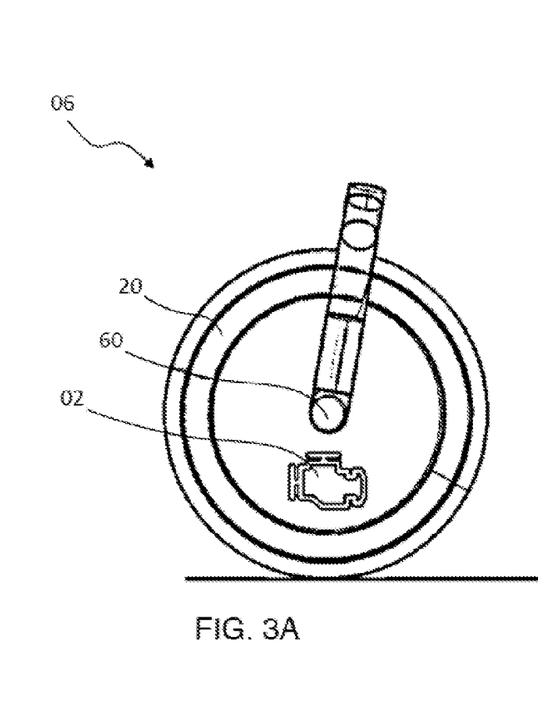
FIG. 3A illustrates a detailed side view of a wheel suspension of a front wheel of the electric-motorized kick-roller that is equipped with an electric-motorized drive, in accordance with embodiments.
Figure 3B:
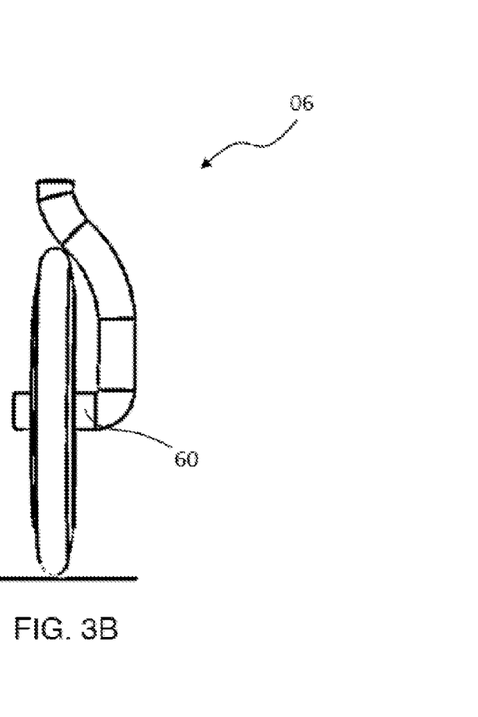
FIG. 3B illustrates a detailed front view of a wheel suspension of a front wheel of the electric-motorized kick-roller that is equipped with an electric-motorized drive, in accordance with embodiments.
Figures 4A, 4B:
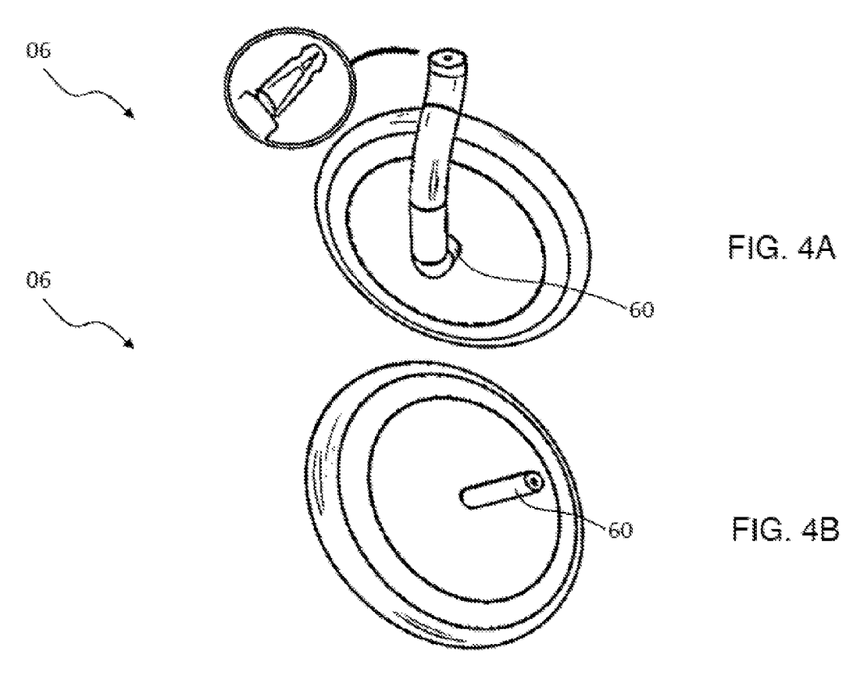
FIG. 4A illustrates a detailed top, perspective view of a wheel suspension of a front wheel of the electric-motorized kick-scooter, in accordance with embodiments.
FIG. 4B illustrates a detailed side, perspective view of a wheel suspension of a front wheel of the electric-motorized kick-scooter, in accordance with embodiments.
Figure 6:
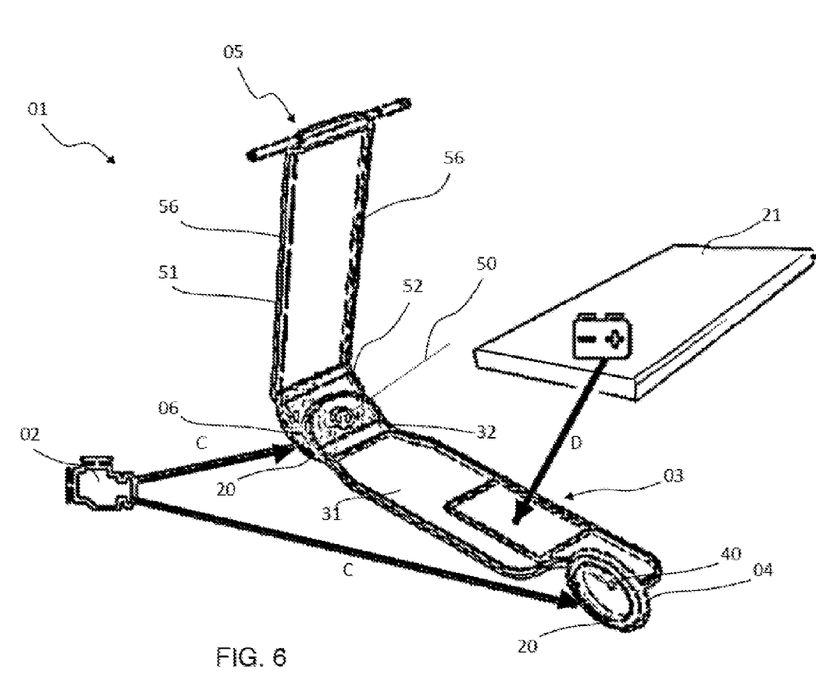
FIG. 6 illustrates a detailed perspective view of a manner in which the electric-motorized drive and the electrical energy storage device, which is required to supply said drive with power, are accommodated on the electric-motorized kick-scooter, in accordance with embodiments.

As illustrated in FIGS. 3A, 3B and 6, the electric-motorized drive 02 may be integrated into the rear wheel 04 and/or the front wheel 06 (as indicated in FIGS. 3A, 3B, and 3C by a motor symbol and in FIG. 6 by an arrow C) that faces from a motor symbol towards the wheels. The electric-motorized drive 02 may comprise an electric wheel hub motor 20 that is arranged directly in a wheel of the kick-scooter 01 and simultaneously supports the wheel hub. A part of the motor transmits the torque that is generated to the wheel and the wheel rotates with said torque. The electric wheel hub motor 20 may be embodied both as an in-runner and also as an out-runner.

As illustrated in FIG. 6, in accordance with embodiments, a rechargeable electrical energy storage device 21 may be accommodated in or on the footboard 03, as an alternative or in addition thereto in or on the steering assembly 05. The steering assembly axis 50 tilts in an inclined manner towards the rear starting from the front wheel 04. The footboard 03 may comprise a standing portion 31, which lies essentially parallel with the roadway when the kick-scooter 01 is in use as a mode of transportation, and a forward portion 32, which is inclined upwards with respect to said standing portion and adjoins said standing portion at a first angle towards the front towards the steerable front wheel 06. The rear wheel 04 is arranged on the end of the standing portion 31 that is remote from the forward portion 32.

The steering assembly axis 50 about which the front wheel 06 is arranged on the footboard 03 in such a manner as to be able to pivot to and fro together with the steering assembly 05 that is connected in a non-rotatable manner to said front wheel 06 is oriented normal to the forward portion 32 that is inclined with respect to the standing portion 31. The steering assembly 05 comprises a front portion 51 and a connecting portion 52 that adjoins said front portion at a second angle.

In accordance with embodiments, the rechargeable electrical energy storage device 21 may be accommodated in the standing portion 31 of the footboard 03 and/or in the front portion 51 of the steering assembly 05. The footboard 03 and the steering assembly 05 may be connected to one another at the forward portion 32 and at the connecting portion 52 in such a manner as to be able to pivot about the steering assembly axis 50. The forward portion 32 and the connecting portion 52 may extend over two parallel planes and the steering assembly axis 50 may be orientated normal to said planes. The connecting portion 52 is arranged on the lower face of the forward portion 32, said lower face facing the front wheel 06.

When the kick-scooter 01 is in a drive position in which the kick-scooter 01 assumes its ready-for-use size, by way of example, when using the kick-scooter 01 as a mode of transportation, the forward portion 51 of the steering assembly 05 may be arranged when viewed in the drive direction ahead of the front face of the forward portion 32 and in so doing is arranged ahead of the front wheel 06.

The first angle that describes the upwards incline of the forward portion 32 with respect to the standing portion 31 of the footboard 03 corresponds to the second angle that describes a bend angle or transition angle between the front portion 51 and the connecting portion 52 of the steering assembly 05. The first angle that describes the upwardly inclined portion of the forward portion 32 with respect to the standing portion 32 of the footboard 03 and the second angle that describes a bend or transition angle between the front portion 51 and the connecting portion 52 of the steering assembly 05 are in each case between 30° and 60°, particularly preferred is 45°.

In the case of the kick-scooter 01, by virtue of a pivot movement of the steering assembly 05 about 180° about the steering assembly axis 50, the steering assembly 05 may be moved out of a drive position, in which the front portion 51 of said steering assembly when the front wheel 06 is in a straight line is oriented towards the front when viewed from the steering assembly axis 50 and is arranged with respect to the standing portion 31 of the footboard 03 at an angle that corresponds to the sum of the first and the second angle, into a packed position as illustrated in FIG. 1C in which the front portion 51 of the steering assembly 05 lies in a parallel manner beneath the standing portion 31 of the footboard, and returned to said drive position.

FIG. 1A corresponds in this case to a drive position in which the front wheel 06 is turned at an angle and the steering assembly 05 is rotated out of a straight orientation slightly about the steering assembly axis 50 and as a consequence is inclined with respect to the standing portion 31 of the footboard.

FIG. 1B illustrates an intermediate position in which it is no longer possible to drive the kick-scooter and the kick-scooter 01 assumes said intermediate position for a short period of time whilst moving from the drive position into the packed position and conversely.

Figure 2:
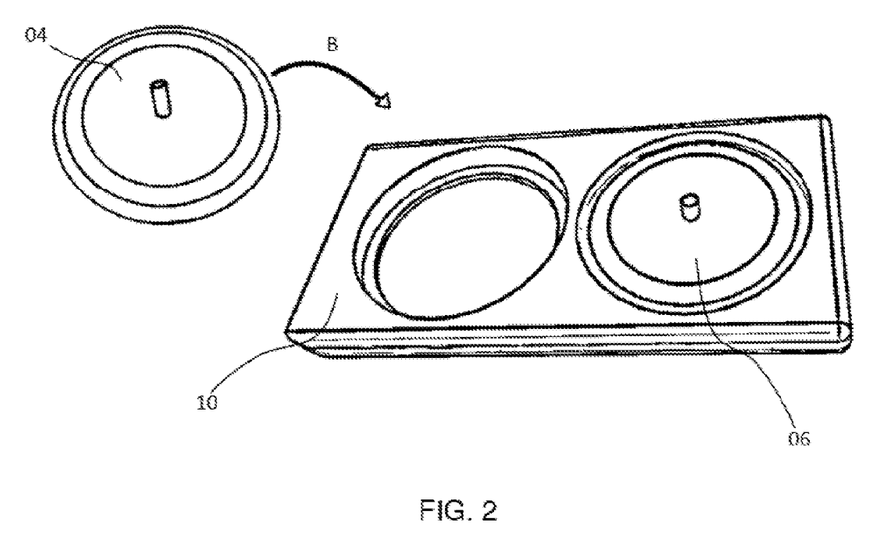
FIG. 2 illustrates a detailed perspective view of a wheel carrier to protect the front wheel and the rear wheel of the electric-motorized kick-scooter when the kick-scooter is not in use and is in the packed position, in accordance with embodiments.

By way of example, for transporting the kick-scooter 01 in the packed position as illustrated in FIG. 1C, it is possible to remove at least the rear wheel 06 and to accommodate said rear wheel in a separate wheel carrier 10 that is provided by way of example with a suitable recess, as indicated in FIG. 2 via an arrow B. Where appropriate, it is possible in order to achieve an even more compact packed size to also remove the front wheel 04 and likewise to accommodate said front wheel in a wheel carrier 10. The wheel carrier 10 may accordingly be embodied as a twin-wheel carrier comprising matching recesses for accommodating both the rear wheel 06 and also the front wheel 04, as illustrated in FIG. 2. The wheel carrier 10 may be carried separately from the kick-scooter 01. It is fundamentally feasible that the wheel carrier 10 may be accommodated or integrated in the footboard 03 or in the steering assembly 05, by way of example as a drawer.

By virtue of accommodating the wheels in a box 10 between the steering assembly 05 and the footboard 03, the two scooter segments 05 and 03 that lie above one another are locked. In the case of a wheel diameter of 12", it is necessary to store the wheels separately and the locking function must be achieved in a different manner. In the packed position, the wheel carrier 10 in the form of a drawer assumes a function of locking the footboard 03 with the steering assembly 05.

The kick-scooter 01 in accordance with embodiments may comprise actuating architecture configured to be arranged on the steering assembly to activate, deactivate and/or control the electric-motorized drive 02.

In accordance with embodiments, it may be possible to control the electric-motorized drive 02 in dependence upon a manually-actuated forwards movement of the kick-scooter 01, by way of example, in a similar manner to an electric-motorized assist device in the case of electric bicycles, where the electric-motorized drive is only activated when the pedal drive is activated manually.

The control procedure may only provide an operation of the electric-motorized drive in the case of a manually actuated forwards movement of the kick-scooter 01. It is possible to detect a manually actuated forwards movement of the kick-scooter 01 by way of example via ascertaining kicking-off movements, whether they are detected via changes in the acceleration and/or in the rotational speed along the travel direction and/or via changes in the vertical loading with respect to the travel direction.

In accordance with embodiments, a system of recovering the braking energy is advantageously provided. In the event of a deceleration, whether it is via actuating a brake or via terminating the manually actuated forwards movement or via restoring an actuating architecture to its initial position, by way of example, in the case of releasing an actuating architecture, the kinetic energy of the kick-scooter 01 may be converted into electrical energy and stored in the electrical energy storage device 21, said stored electrical energy then being available for a subsequent operation of the electric-motorized drive 02.

In accordance with embodiments, the front portion 51 comprises a handle portion 53 having at least one hand grip 54. The hand grip 54 may be produced via a recess that forms a grip opening and is provided in a front portion 51 that is embodied by way of example as a front plate 55 or comprises a front plate 55. Two hand grips 54 may be provided protruding laterally out of the front portion 51.

Figure 5A:
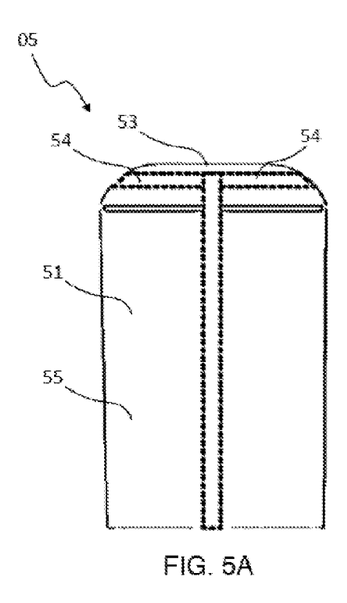
FIG. 5A illustrates a detailed front view of a forward portion comprising telescopic hand grips of a steering assembly of an electric-motorized kick-scooter showing the hand grips drawn inwards, in accordance with embodiments.
Figure 5B:
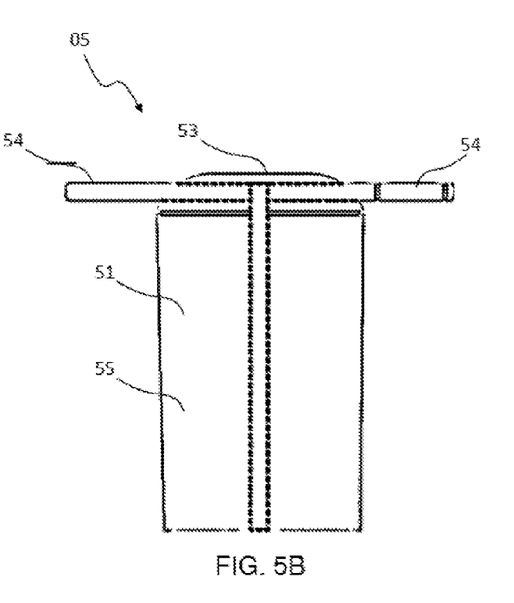
FIG. 5B illustrates a detailed front view of a forward portion comprising telescopic hand grips of a steering assembly of the electric-motorized kick-scooter showing the hand grips extended outwards, in accordance with embodiments.

As illustrated in FIGS. 5A and 5B, in order to achieve a compact packed size, the hand grips 54 may be laterally telescopic. FIG. 5A illustrates the hand grips 54 in a state in which the grips are retracted or drawn into the front plate while FIG. 5B illustrates the drive state in which the telescopic hand grips 54 protrude laterally out of the front portion 51. The front portion 51 may comprise the laterally telescopic hand grips 54.

As an alternative or in addition thereto, the front portion 51 may comprise a handle portion 53 having at least one hand grip 54 and the spacing of said handle portion with respect to the connecting portion 52 may be changed in a telescopic manner. The front portion 51 may comprise a front plate 55 as illustrated in FIGS. 1A-1C, 5A and 5B. Alternatively, the front portion 51 may be embodied in an open manner, by way of example having a height-adjustable telescopic rod 56 in the centre or on both sides (FIG. 6). The connecting portion 52 may be embodied as a splash guard.

The electric-motorized kick-scooter 01 may be embodied in any desired size, by way of example as an electric-motorized mini kick-scooter with a wheel diameter of a maximum approx. 15 cm or 6", or as an electric-motorized full-size kick-scooter with a wheel diameter of by way of example 30 cm or 12". The rear wheel 04 of the electric-motorized kick-scooter 01 may be equipped with a single tyre or twin-tyres.

The electric-motorized kick-scooter 01 may be collapsed or folded via pivoting the steering assembly 05 about the steering axis 50. As an alternative to the rear wheel 04 being removed in the packed position, it may be pivoted about a horizontal axis that extends along the standing portion 31, as a consequence of which the front portion 51 may be rotated precisely as close to the lower face of the standing portion 31 as if the rear wheel 04 had been removed.

Embodiments may be achieved via a kick-scooter 01 having an electric-motorized drive 02, in which the steering assembly 05, which may comprise by way of example a front plate 55, may be pivoted about a steering axis 50 that is oriented in an inclined manner and extends in a point of rotation through the footboard 03 and the steering assembly 05 so as to move underneath the footboard. The steering assembly 05 is to lay in a parallel manner and may be manipulated to a locked position. The wheels 04, 06 including the spigot 40, 60 on which said wheels are mounted, may comprise a plug connector system. In the packed position, the wheels 04, 06 may be located in a wheel carrier 10 that is accommodated in the footboard 03. The hand grips 54 that are formed by the steering assembly stump are telescopic. The kick-scooter 01 renders it possible to achieve a purely electrical forwards movement and a purely manually actuated forwards movement and also to achieve a mixed operation using the muscle power-actuated kick assist device. The kick-scooter 01 may comprise an electric brake which renders it possible to recover energy.

Advantages are achieved, inter alia, via a reduced number of required steps to fold or unfold the kick-scooter 01, its use as a suitcase trolley, a small packed size that has a rectangular shape to be easily stowed by way of example in a luggage compartment of a passenger car. The kick-scooter 01 may comprise an unfolding and folding mechanism that is self-explanatory and despite only a few steps produces a very compact packed size but in the drive position or ready-for-use size is still rigid and robust. The kick-scooter 01 offers the facility for transporting one person but also to transport shopping and suitcases. In the packed position, the front wheel 06 that has not been removed renders it possible to use said kick-scooter as a suitcase trolley.

It is important to mention that it only takes a few seconds to set up the kick-scooter 01 using the steering assembly axis 50. For example, in a first process block, the kick-scooter 01 may be manipulated in progression from FIG. 1C to FIG. 1B to FIG. 1A, the footboard 03 is rotated with respect to the steering assembly 05 into the drive position. In a second process block, using a threaded nut, the standing board and front plate may be locked on the steering assembly axis 50. In a third process block, the wheels 04, 06 may be removed from the wheel carrier 10 and pushed onto the spigots 40, 60 that carry said wheels 04, 06. In a fourth process block, the hand grips 54 are pulled out of the handle portion 53 of the steering assembly 05 and locked, as illustrated in FIG. 5.

It is likewise important to mention that the materials that may be used make the kick-scooter 01 light in weight, durable and robust. It is thus possible to use a metal such as aluminium, but also a composite material based on carbon fibres may be used. The kick-scooter 01 consumes a volume of 15 l at a weight of 8.3 kg.

In accordance with embodiments, the kick-scooter 01 may comprise a rear wheel drive, a kick assist device and an electric brake. Alternatively or additionally, it may be feasible to provide an electric drive for the front wheel 06 and the rear wheel 04. The drive is also possible in a conventional manner by kicking off from the roadway. When driven electrically, the velocity is controlled by way of actuating architecture that may be embodied as an accelerator lever, similar to that used in classic motor scooters. Energy may be returned to the electrical energy storage device 21 by way of an electric-motorized brake that uses the electric-motorized drive 02 as a generator. Consequently, the kick-scooter 01 is extremely economic to run, high performing and efficient. When fitted with its electric drive, the kick-scooter 01 may achieve a maximum velocity of 25 m/h.

In accordance with embodiments, the electric-motorized drive 02 of the kick-scooter 01 may be located in the wheels 04, 06. By way of example, a brushless DC motor is provided for this purpose and said motor is supplied with energy by way of a rechargeable battery that is used as an electrical energy storage device 21 and is installed underneath the standing portion 31 of the footboard 03. The rechargeable battery is removable. It is possible to use a commercially available power pack that when charged achieves a range between 60-150 km.

In accordance with embodiments, the arrangement of the hand grips 54 in the drive position is designed for persons with a body size of preferably between 1.5 m and 1.9 m. By virtue of a telescopic mechanism, the two hand grips 54 may be pulled out and pushed back in on the left hand side and right hand side of the handle portion 53. For this purpose, it is possible to actuate in each case a button on the sides of the front portion 51, by way of example on the handle portion 53, in order to be able to pull out and push back in the hand grips 54. The hand grips 54 may be mechanically locked in the pulled-out position, by way of example via a vigorous rotation. The use of telescopic rods renders it possible to plug the hand grips 54 into one another and thus stow them in a positive-locking manner in the kick-scooter 01. This has the advantage that none of the parts may impair the packing process and possibly injure the user.

In accordance with embodiments, the wheels 04, 06 may comprise in each case a shaft or spigot 40, 60, a steel axle, that is pushed into a receiving arrangement on the kick-scooter 01. An alternative is produced via spigots 40, 60 that are fixedly connected to the kick-scooter 01, the wheels being pushed onto said spigots. Both the procedure of pushing the shafts into the receiving arrangements and also pushing the wheels 04, 06 onto the spigots 40, 60 produce an acoustic control signal when the respective wheel 04, 06 is fixedly mounted. The wheels 04, 06 may also be removed in a likewise simple manner. For this purpose, a push button is pressed on the front portion and on the shaft, whereby the shaft is released.

The wheel carrier 10 for the front wheel 06 and the rear wheel 04 may be located between the standing portion 31 of the footboard 03 and the inwards-turned front portion 51 of the steering assembly 05. This renders it possible to prevent the wheel carrier 10 from unintentionally rotating the kick-scooter 01. It is preferred that the rotating movement may only be performed after the wheel carrier 10 has been removed and the two wheels 04, 06 mounted in place. When folded up, the concept is not larger than a trolley and may be stowed in the passenger car by way of example on or as a parcel shelf underneath the rear windscreen. Its small size also renders it possible to accommodate multiple scooters in the luggage compartment in a space-saving manner.

As an alternative or in addition thereto, the kick-scooter 01 may comprise individual or a combination of features that are mentioned in the introduction in conjunction with the prior art and/or in one or more of the documents mentioned in the prior art and/or in the preceding description and/or claims.

Embodiments, may be applied in particular in the industry of producing mode of transportation for individual mobility.

The term "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural members that do not differ from the literal language of the claims, or if they include equivalent structural members with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE NUMERALS

01 Kick-scooter
02 Electric-motorized drive
03 Footboard
04 Rear wheel
05 Steering assembly
06 Front wheel
10 Wheel carrier
20 Electric wheel hub motor
21 Electrical energy storage device
31 Standing portion
32 Forward portion
40 Spigot
50 Steering assembly axis
51 Front portion
52 Connecting portion
53 Handle portion
54 Hand grip
55 Front plate
56 Telescopic rod
60 Spigot
A Arrow
B Arrow
C Arrow
D Arrow

What is claimed is:

1. A kick-scooter, comprising:
a footboard having a standing footboard portion and a forward footboard portion that adjoins the standing footboard portion at a first angle;
a steering assembly having a front steering portion and a connection steering portion that adjoins the front steering portion at a second angle that corresponds to the first angle, the footboard and the steering assembly being connected to one another at the forward footboard portion and at the connection steering portion to pivot about a steering assembly axis;
a rear wheel arranged on the footboard;
a front wheel that is connected to the steering assembly to pivot in unison with the steering assembly about the steering assembly axis, the steering assembly axis being tilted in an inclined manner from the front wheel towards the rear wheel;
an electric-motorized drive integrated in at least one of the rear wheel and the front wheel; and
an electrical energy storage device arranged in or on at least one of the footboard and the steering assembly, wherein;
the forward footboard portion and the connection steering portion extend over two parallel planes and the steering assembly axis is orientated normal to the parallel planes,
in a drive position, the front steering portion is arranged ahead of the front wheel,
the connecting portion is arranged on the lower face of the forward portion facing the front wheel, and
by virtue of a pivot movement about 180° about the steering assembly axis, the steering assembly is configured for movement between the drive position, in which the front steering portion is positioned upright with respect to the standing footboard portion, and a storage position, in which the front steering portion lies in a parallel manner underneath the standing footboard portion.

2. The kick-scooter of claim 1, wherein the first angle and the second angle are 30° to 60°, respectively.

3. The kick-scooter of claim 1, wherein the first angle and the second angle are 45°, respectively.

4. The kick-scooter of claim 1, wherein the electrical energy storage device is arranged in at least one of the standing footboard portion and the front steering portion.

5. The kick-scooter of claim 1, further comprising actuating architecture arranged on the steering assembly to at least one of activate, deactivate, and control the electric-motorized drive.

6. The kick-scooter of claim 1, wherein the electric-motorized drive is configured to be controlled independent of a manually-actuated forward movement of the kick-scooter.

7. The kick-scooter of claim 6, wherein control of the electric-motorized drive is to permit operation of the electric-motorized drive in a case of a manually-actuated forward movement of the kick-scooter.

8. The kick-scooter of claim 1, wherein the front steering portion comprises a front plate.

9. The kick-scooter of claim 1, wherein the front steering portion comprises a handle portion having at least one hand grip.

10. The kick-scooter of claim 9, wherein spacing of the handle portion with respect to the connection steering portion is adjustable.

11. The kick-scooter of claim 9, wherein spacing of the handle portion with respect to the connection steering portion is telescopically adjustable.

12. The kick-scooter of claim 1, wherein the front steering portion comprises laterally telescopic hand grips.

13. The kick-scooter of claim 1, wherein the connection steering portion comprises a splash guard.

14. A scooter, comprising:
a footboard having a standing footboard portion and a forward footboard portion that adjoins the standing footboard portion at a first angle;
a steering assembly having a front steering portion and a connection steering portion that adjoins the front steering portion at a second angle, the footboard and the steering assembly being connected to one another at the forward footboard portion and at the connection steering portion to pivot about a steering assembly axis;
a rear wheel arranged on the footboard;
a front wheel configured to pivot in unison with the steering assembly about the steering assembly axis, the steering assembly axis being tilted in an inclined manner from the front wheel towards the rear wheel;
an electric-motorized drive integrated in at least one of the rear wheel and the front wheel; and an electrical energy storage device arranged in or on at least one of the footboard and the steering assembly, wherein the steering assembly is movable about the steering assembly axis between a drive position, in which the front steering portion is positioned upright with respect to the standing footboard portion, and a storage position, in which the front steering portion lies in a parallel manner underneath the standing footboard portion.

15. The scooter of claim 14, wherein the first angle is the same as the second angle.

16. The scooter of claim 14, wherein the front steering portion comprises a handle portion having at least one hand grip.

17. The scooter of claim 16, wherein spacing of the handle portion with respect to the connection steering portion is adjustable.

18. The scooter of claim 16, wherein spacing of the handle portion with respect to the connection steering portion is telescopically adjustable.

19. The scooter of claim 14, wherein the front steering portion comprises laterally telescopic hand grips.

20. A scooter, comprising:
a footboard having a standing footboard portion and a forward footboard portion that adjoins the standing footboard portion;
a steering assembly having a front steering portion and a connection steering portion that adjoins the front steering portion, the footboard and the steering assembly being connected to one another at the forward footboard portion and at the connection steering portion to pivot about a steering assembly axis;
a rear wheel arranged on the footboard;
a front wheel configured to pivot with the steering assembly about the steering assembly axis; and
an electric-motorized drive integrated in at least one of the rear wheel and the front wheel,
wherein the steering assembly is movable about the steering assembly axis between a drive position, in which the front steering portion is positioned upright with respect to the standing footboard portion, and a storage position, in which the front steering portion lies in a parallel manner underneath the standing footboard portion.

* * * * *